Figure 1:
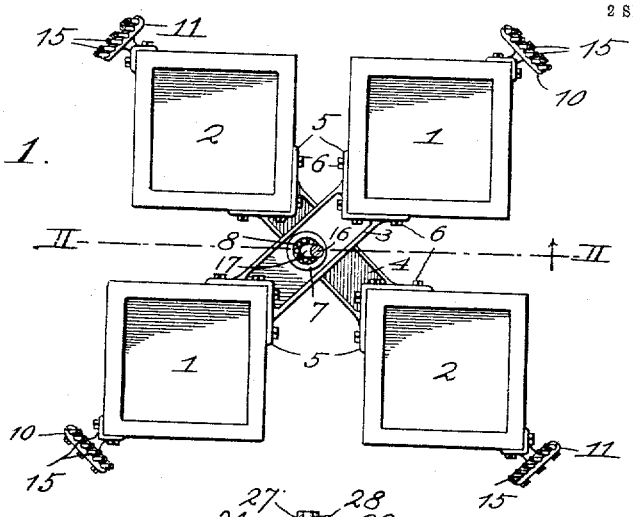

09. CLASSIFYING
AND ASSORTING

G. W. & F. D. COMBS.
F BALANCING GYRATING MACHINE.
APPLICATION FILED AUG. 22, 1907.

Re. 12,894.

Reissued Dec. 15, 1908.

2 SHEETS—SHEET 1

Witnesses:-
R. E. Hamilton
M. Cox.

Inventors
G. W. Combs and F. D. Combs
By F. G. Fischer Atty.

THE NORRIS PETERS CO., WASHINGTON, D. C

CLASS
AND ASSORTING

G. W. & F. D. COMBS.

SELF BALANCING GYRATING MACHINE.

APPLICATION FILED AUG. 22, 1907.

12,894. Reissued Dec. 15, 1908.

2 SHEETS—SHEET 2.

Witnesses:—
R. E. Hamilton.
M. Cox

Inventors:
G. W. Combs and F. D. Combs
By F. G. Fischer, atty.

THE NORRIS PETERS CO., WASHINGTON, D. C.

CLASSIFYING
AND ASSORTING

UNITED STATES PATENT OFFICE.

GEORGE W. COMBS AND FREDERICK D. COMBS, OF LEAVENWORTH, KANSAS.

SELF-BALANCING GYRATING MACHINE.

No. 12,894. Specification of Reissued Letters Patent. Reissued Dec. 15, 1908.

Original No. 798,015, dated August 22, 1905, Serial No. 212,281. Application for reissue filed August 22, 1907. Serial No. 389,757.

*To all whom it may concern:*

Be it known that we, GEORGE W. COMBS and FREDERICK D. COMBS, citizens of the United States, and residents of Leavenworth, in the county of Leavenworth and State of Kansas, have invented certain new and useful Improvements in Self-Balancing Gyrating Machines, of which the following is a specification.

Our invention relates to improvements in self-balancing gyrating machines, and consists more particularly of simple and inexpensive means for driving and balancing sieve-boxes for bolting or sifting machines, and other machines having a gyrating motion.

In the usual construction of machines of this character, it is customary to rigidly unite two sieve-boxes and drive them with a centrally-disposed shaft journaled in stationary bearings and having two cranks extending in the same direction. This construction throws all the weight of the boxes on one side of the shaft, necessitating the use of heavy counterbalance-weights, large bearings, and a heavy cast-iron frame to maintain the shaft in a perpendicular position and support the heavy weights. The principal objection to this construction is that the vibration of the sieve-boxes is transmitted by the shaft and its supports to the building and subjects the same to heavy strains. We overcome this objection by employing four sieve-boxes connected in diagonal pairs by diagonally arranged bridge-trees, and driving said boxes with a centrally disposed shaft having two like sets of oppositely-extending cranks journaled in central bearings on the bridge-trees. With this construction the sieve-boxes which are supported independently of the power transmission devices by resilient rods, balance each other and the shaft so that the operation of the machine will be unattended by vibration because the shaft is driven by yielding means and the resilient rods supporting one pair of boxes swing in an opposite direction to those supporting the other pair of boxes, consequently all tendency of the latter to vibrate the building will be counteracted by the former.

In order that the invention may be readily understood, reference will now be made to the accompanying drawings, in which:—

Figure 2:
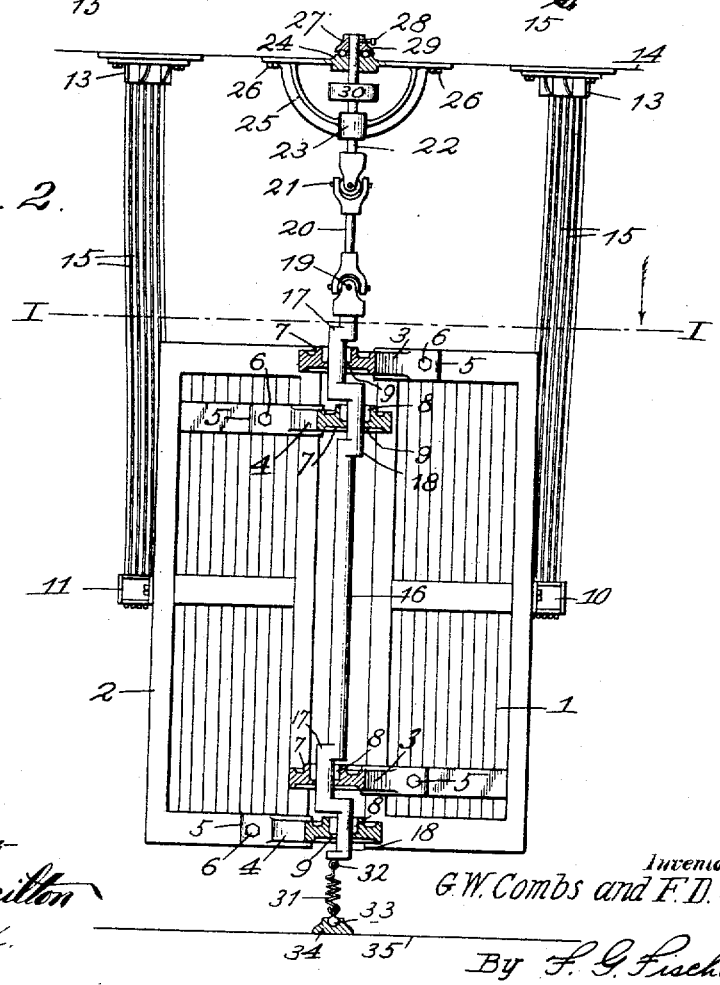
Figure 3:
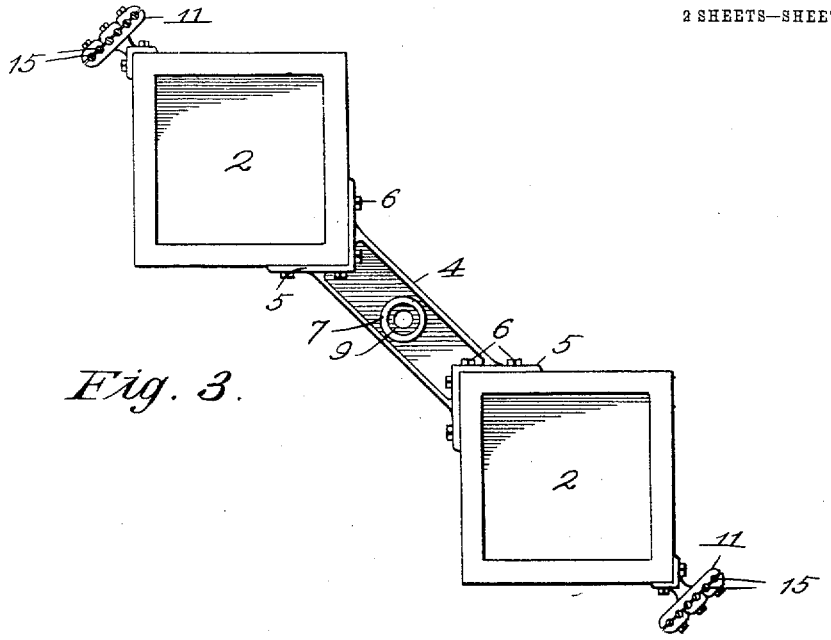
Figure 4:
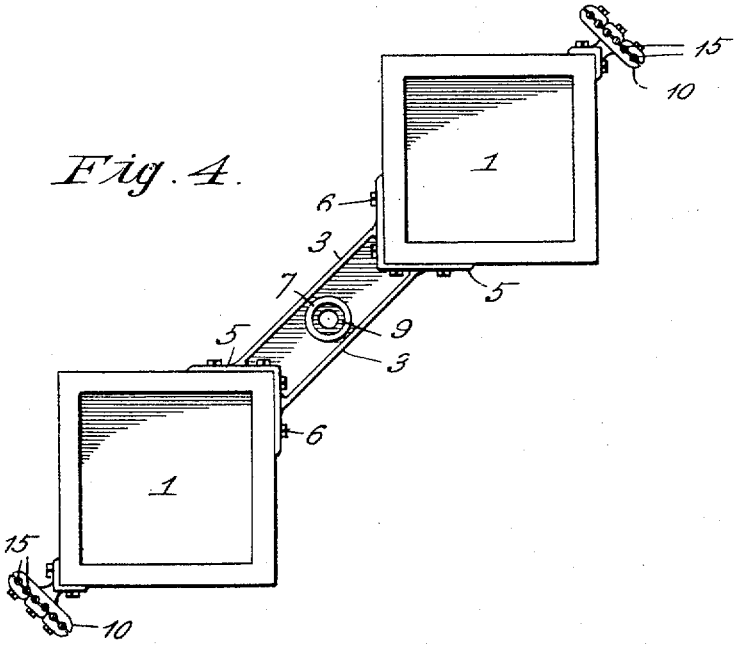

Figure 1 represents a plan view, partly in section of our improved machine taken on line I—I of Fig. 2. Fig. 2 is a vertical central section of the same, taken on line II—II of Fig. 1. Figs. 3 and 4 are detail plan views showing the manner in which the sieve-boxes are connected in pairs.

In the present construction, we employ four sieve-boxes 1—2 arranged perpendicularly and connected in diagonal pairs near their opposite ends by diagonally-arranged bridge-trees 3 and 4, respectively. The bridge-trees terminate at their opposite ends in right angular flanges 5 secured by bolts 6 to the corners of the sieve-boxes, as shown in Figs. 3 and 4, and have centrally-disposed bearings 7 provided with vertically arranged antifriction rollers 8 supported by underlying flanges 9 formed integral with the lower sides of the bearings.

10 designates a pair of brackets secured to the central portion of the outer corners of the sieve-boxes diagonally opposite the corners to which the bridge-trees are secured; and 11 designates a similar pair of brackets secured in a like manner to the outer corners of sieve-boxes 2.

13 designates hangers secured to ceiling 14.

15 designates a plurality of resilient rods secured at their opposite ends to brackets 10—11 and the hangers 13 in order to support the sieve-boxes.

16 designates a centrally-disposed main shaft having two like sets of oppositely-disposed cranks 17—18, journaled in bearings 7, and yieldingly connected at its upper end by a universal-joint 19 to a short section of shafting 20 yieldingly connected at its upper end by a universal-joint 21 to a short section of shafting 22 journaled in the bearings 23—24 of hanger 25 secured to the ceiling by bolts 26. The driving shaft 22 is suspended from a cap 27 secured to its upper end by a set-screw 28 and in order to avoid all unnecessary friction, antifriction balls 29 are interposed between the cap and the upper side of bearing 24.

30 designates a stationary drive-pulley rigidly mounted on shaft 22 between bearings 23 24 thereby affording resistance to the tension of the driving belt.

Tendency of the shaft 16 to gyrate is, practically, overcome by a contractile spring 31 secured at its opposite ends to an eye 32 in the end of the lower crank 18, and a ball 33 in a socket 34 secured to floor 35 in line with the axis of the main portion of the shaft. Both the eye and the ball and socket connection constitute universal joints.

In practice, the short sections of shafting and the universal-joints may be dispensed with by extending shaft 16 up into the bearings of hanger 25, but it is preferable to use these parts as it permits the main-shaft and sieve-boxes to automatically assume a central position between hangers 13 in case care is not exercised in placing the latter at an equal distance from the center of the bearings of hanger 25. It also prevents shaft 16 from vibrating or transmitting undue strains to the building.

While we have shown the main-shaft arranged to be driven from above, it can of course be extended through floor 35 of the building and driven by a pulley mounted upon its lower end, when desired.

Although we have shown four sieve-boxes, six or eight may be employed, and we of course reserve the right to make such changes as properly fall within the scope of the appended claims.

Having thus described our invention, what we claim and desire to secure by Letters Patent, is:—

1. A gyrating machine consisting of a plurality of sieve-boxes, independent bridge-trees connecting the boxes in diagonal pairs and provided with centrally-disposed bearings, and a centrally-arranged shaft having for each pair oppositely disposed cranks journaled in the bearings.

2. A gyrating machine consisting of a plurality of vertically-arranged sieve-boxes, diagonally-extending independent bridge-trees connecting the boxes in diagonal pairs and provided with centrally-disposed bearings, and a centrally-arranged vertical shaft having for each pair of boxes oppositely disposed cranks journaled in the bearings.

3. A gyrating machine consisting of a plurality of sieve-boxes, bridge-trees connecting the boxes in diagonal pairs and provided with centrally-disposed bearings, a centrally-arranged shaft having oppositely-disposed cranks journaled in the bearings, a hanger having two bearings in which the upper portion of the shaft is journaled, a cap secured to the upper end of the shaft, antifriction-balls interposed between the cap and the adjacent bearing of the hanger, and means for rotating the shaft from a point between the bearings.

4. A gyrating machine consisting of a plurality of sieve-boxes, bridge-trees connecting the boxes in diagonal pairs and provided with centrally-disposed bearings, a centrally-arranged vertical main shaft having oppositely-disposed cranks journaled in the bearings, a hanger having two bearings, a drive-shaft journaled therein, a short section of shafting arranged between the main and the driving shafts, and universal joints connecting the adjacent ends of the shafting.

5. A gyrating machine consisting of four boxes, bridge-trees arranged in duplicate pairs extending at right angles to each other and connecting the boxes in diagonal pairs, centrally-disposed bearings formed integral with the bridge-trees, and a centrally-arranged shaft having two like sets of oppositely-disposed cranks journaled in the bearings.

6. A gyrating machine consisting of a plurality of sieve-boxes, diagonally-extending bridge-trees connecting the boxes in diagonal pairs and provided with centrally-disposed bearings, a centrally-arranged shaft having oppositely-disposed cranks journaled in the bearings, and means for preventing the shaft from gyrating consisting of a member connected by universal joints with one extreme crank of the shaft and a stationary object.

7. A gyrating machine consisting of a plurality of sieve-boxes, diagonally-extending bridge-trees connecting the boxes in diagonal pairs and provided with centrally-disposed bearings, a centrally-arranged shaft having oppositely-disposed cranks journaled in the bearings, a spring, and universal connections at its opposite ends to a stationary object and the end of the lower crank on the shaft to prevent the latter from gyrating.

8. A gyratory machine consisting of a plurality of sieve-boxes, independent members connecting said boxes in diagonal pairs, and a shaft having for each pair oppositely-disposed means mounted in said members for imparting a gyratory motion to the boxes.

9. In combination, a gyratory structure freely suspended, a crank-shaft centrally-disposed therein, a stationary driver, and yielding power transmission devices between the shaft and driver, said power transmission devices being normally in axial alinement with the crank-shaft.

10. In combination, a gyratory structure freely suspended, a vertically-positioned shaft therefor, and a resilient member loosely connected to said shaft and a stationary object such as an adjacent portion of the building for restraining abnormal throw of the structure, said member being normally in line with the axis of the shaft.

In testimony whereof we affix our signatures in the presence of two witnesses.

GEORGE W. COMBS.
FREDERICK D. COMBS.

Witnesses to the signature of George W. Combs:

L. N. LARSEN,
FRANCES WELLS.

Witnesses to the signature of Frederick D. Combs:

SAML. H. WILSON,
T. J. SMEDDICK.